United States Patent
Zhao et al.

(10) Patent No.: US 9,139,443 B2
(45) Date of Patent: Sep. 22, 2015

(54) HOLLOW SILICA NANOMATERIALS AND METHOD OF MAKING

(71) Applicant: University of North Dakoa, Grand Forks, ND (US)

(72) Inventors: Julia Xiaojun Zhao, Grand Forks, ND (US); Jiao Chen, Grand Forks, ND (US)

(73) Assignee: University of North Dakoa, Grand Forks, ND (US)

( * ) Notice: Subject to any disclaimer, the term of this patent is extended or adjusted under 35 U.S.C. 154(b) by 0 days.

(21) Appl. No.: 14/010,670

(22) Filed: Aug. 27, 2013

(65) Prior Publication Data
US 2015/0064467 A1    Mar. 5, 2015

(51) Int. Cl.
*C01B 33/12* (2006.01)
*C01B 33/18* (2006.01)

(52) U.S. Cl.
CPC .................. *C01B 33/12* (2013.01); *C01B 33/18* (2013.01); *C01P 2004/61* (2013.01)

(58) Field of Classification Search
CPC .............................. C01B 33/18; C01P 2004/61
USPC ........................................................ 423/335
See application file for complete search history.

(56) References Cited

U.S. PATENT DOCUMENTS 7,781,060 B2    8/2010   Li et al.
8,440,229 B2    5/2013   Trogler et al.

OTHER PUBLICATIONS

Xue-Jun Wu, et al, "A Unique Transformation Route for Synthesis of Rodlike Hollow Mesoporous Silica Particles", The Journal of Physical Chemistry, dx.doi.org/10.1021/jp110689k/J.Phys.Chem.C2011. 115,11345-11347, Date: May 23, 2011.

*Primary Examiner* — Matthew E Hoban
*Assistant Examiner* — James Fiorito
(74) *Attorney, Agent, or Firm* — Kinney & Lange, P.A.

(57) ABSTRACT

One embodiment of the present invention is a hollow silica nanomaterial (HSN). The HSN includes silicon dioxide ($SiO_2$) molecules which join together to form a shell. The shell extends from a first end to a second end and has a generally circular cross section, an inner surface and an opposite outer surface. Another embodiment of the present invention includes a method for forming an HSN. The method includes combining polyvinylpyrrolidone (PVP) and an alcohol to form a mixture, adding water to the mixture, adding sodium citrate to the mixture, adding a silicon-containing compound to the mixture, adding a catalyst to the mixture, and collecting hollow silica nanomaterials.

23 Claims, 4 Drawing Sheets

HOLLOW SILICA NANOMATERIALS AND METHOD OF MAKING

STATEMENT OF GOVERNMENT INTEREST

This invention was made with government support under Grant No. CHE0947043 awarded by the National Science Foundation. The government has certain rights in the invention.

BACKGROUND

The present invention relates generally to hollow inorganic nanomaterials and methods for making them. More particularly, the invention relates to hollow silica nanomaterials (HSNs). Hollow inorganic nanomaterials are attracting a significant amount of attention from those skilled in the art. The increase in attention is due to the potential applications hollow inorganic nanomaterials have in areas such as bioanalysis, drug delivery, active metal encapsulation, and in acting as nano-reactors for catalysis. Researchers have synthesized a wide range of hollow spherical nanomaterials including those composed of $TiO_2$, $SnO_2$, $Fe_3O_4$, and $SiO_2$.

HSNs are attractive synthetic targets. This is because of the hydrophobic nature, easy colloidal suspension formation, excellent biocompatibility, and surface functionalization accessibility offered by HSNs. Researchers have taken advantage of these properties to devise useful applications for HSNs.

Two methods are commonly used to synthesize hollow nanomaterials: hard-templating and template-free synthesis. The hard-template method generally involves: (1) the preparation of a template as a solid core; (2) surface functionalization by depositing a silica shell on the surface of the template; and (3) removal of the template by either calcination at high temperatures or selective etching. The morphology of the hollow silica nanomaterials is controlled by the template used during synthesis. The desirability of using the hard-template method however, is tempered by some drawbacks associated with it. For instance, the hard-template method is a multi-step procedure and is both time consuming and difficult to optimize for large-scale synthesis. A further disadvantage of the hard template method is that the removal of the template may cause the hollow nanomaterial to collapse. These difficulties are a function of the harsh nature of the calcination reactions and selective etching solvents used for removing the template.

An alternative to the hard template method is the template-free method. An advantage to the template-free method is that no template removal step is required. The template-free method however, presents difficulties in controlling the size, shape, monodispersity, and surface structure of the hollow silica nanomaterials.

The synthesis of HSNs remains difficult. Most applications of any technique require strict reaction conditions, in addition to high costs and tedious synthetic procedures. Moreover, although researchers have been able to synthesize rod-like materials having a hexagonal cross-section and spherical HSNs, the morphology of the HSNs is generally not tunable. As a result, synthesizing an HSN while controlling the morphology of the nanomaterial is difficult.

SUMMARY

One embodiment of the present invention is a hollow nanomaterial. The hollow nanomaterial includes silicon dioxide ($SiO_2$) molecules which join together to form a shell. The shell extends from a first end to a second end and has a generally circular cross section, an inner surface and an opposite outer surface.

Another embodiment of the present invention includes a method for forming a hollow silica nanomaterial. The method includes combining polyvinylpyrrolidone (PVP) and an alcohol to form a mixture, adding water to the mixture, adding sodium citrate to the mixture, adding a silicon-containing compound to the mixture, adding a catalyst to the mixture, and collecting hollow silica nanomaterials.

DETAILED DESCRIPTION

Figure 1:
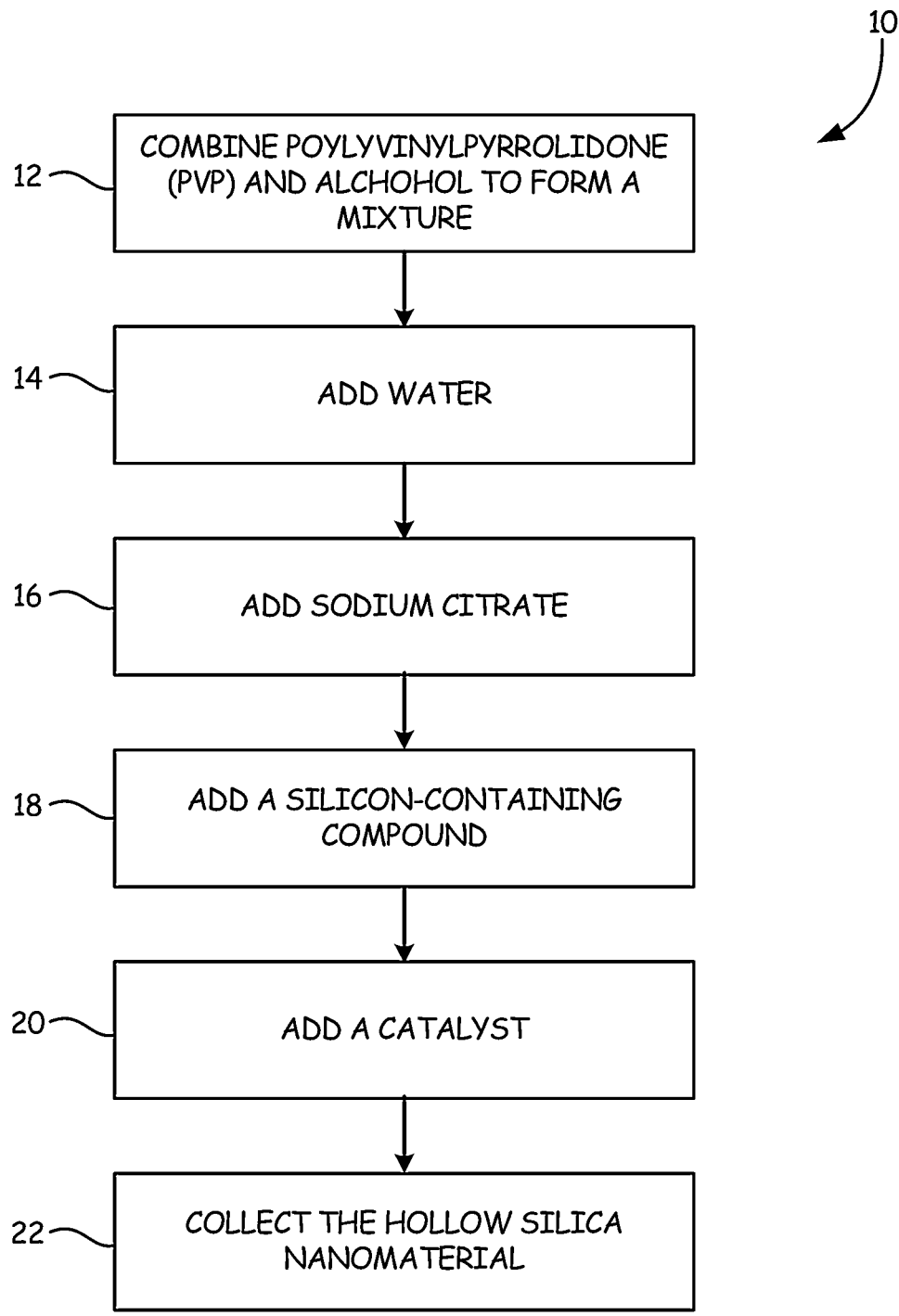
FIG. 1 is a block diagram illustrating one embodiment of a method for making hollow silica nanomaterials (HSNs).

According to the present invention, hollow silica nanomaterials (HSNs) are synthesized. Synthesis can be achieved using a one-pot synthetic method. One embodiment of the method described herein is illustrated in FIG. 1. Method 10 includes forming a mixture by combining polyvinylpyrrolidone (PVP) and an alcohol (step 12), adding water to the mixture (step 14), adding sodium citrate to the mixture (step 16), adding a silicon-containing compound to the mixture (step 18), and adding a catalyst to the mixture (step 20). In step 22, an HSN is collected. As described in greater detail below, the method enables the formation of several types of HSNs.

Figure 2A:
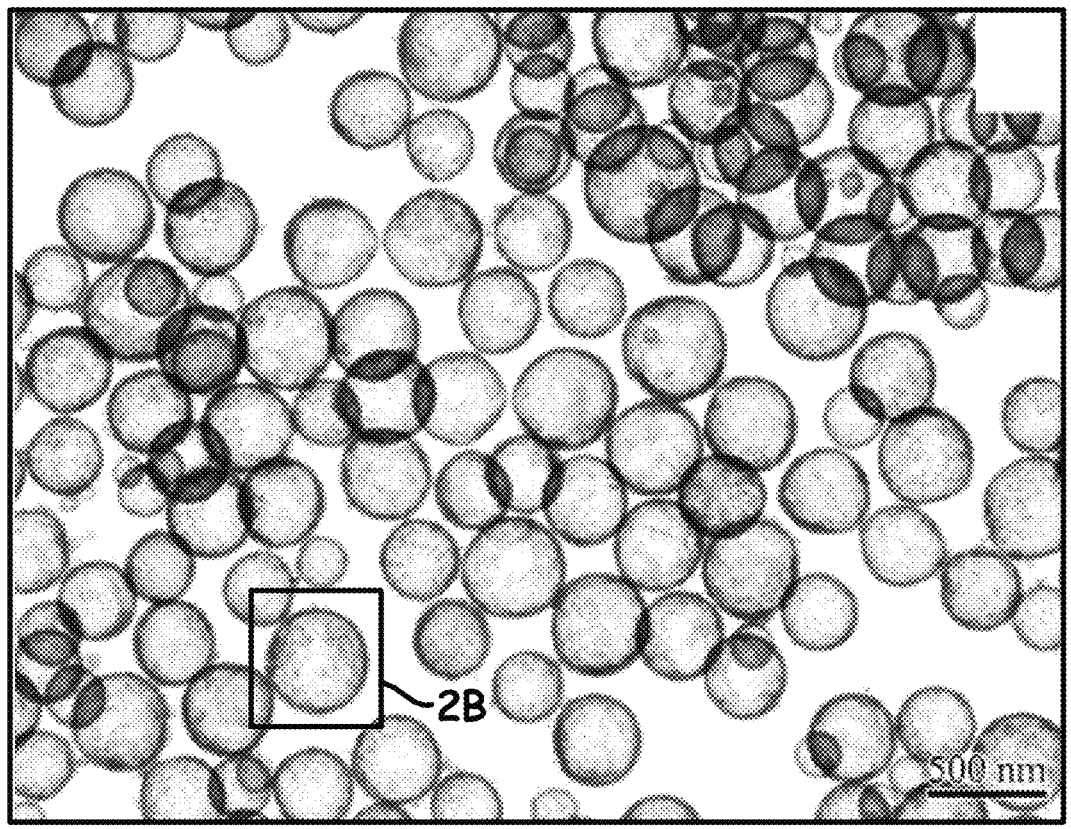
FIGS. 2A and 2B show spherical HSNs.
Figure 2B:
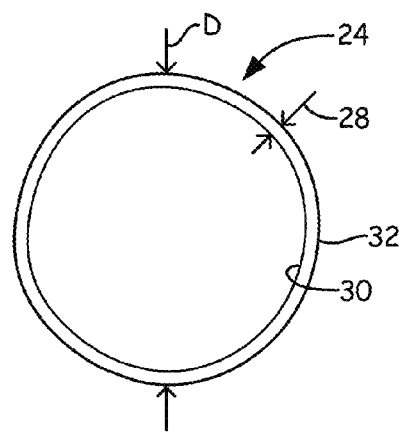

FIG. 2A is a transmission electron microscopy (TEM) image showing spherical HSN 24, which can be produced by the method described herein. An enlarged representation of spherical HSN 24 is shown in FIG. 2B. Spherical HSN 24 has diameter D. Silica shell 28 includes inner surface 30 and opposite outer surface 32. Diameter D gives spherical HSN 24 a generally spherical shape. Spherical HSN 24 is hollow and includes inner surface 30 and opposite outer surface 32.

Figure 3A:
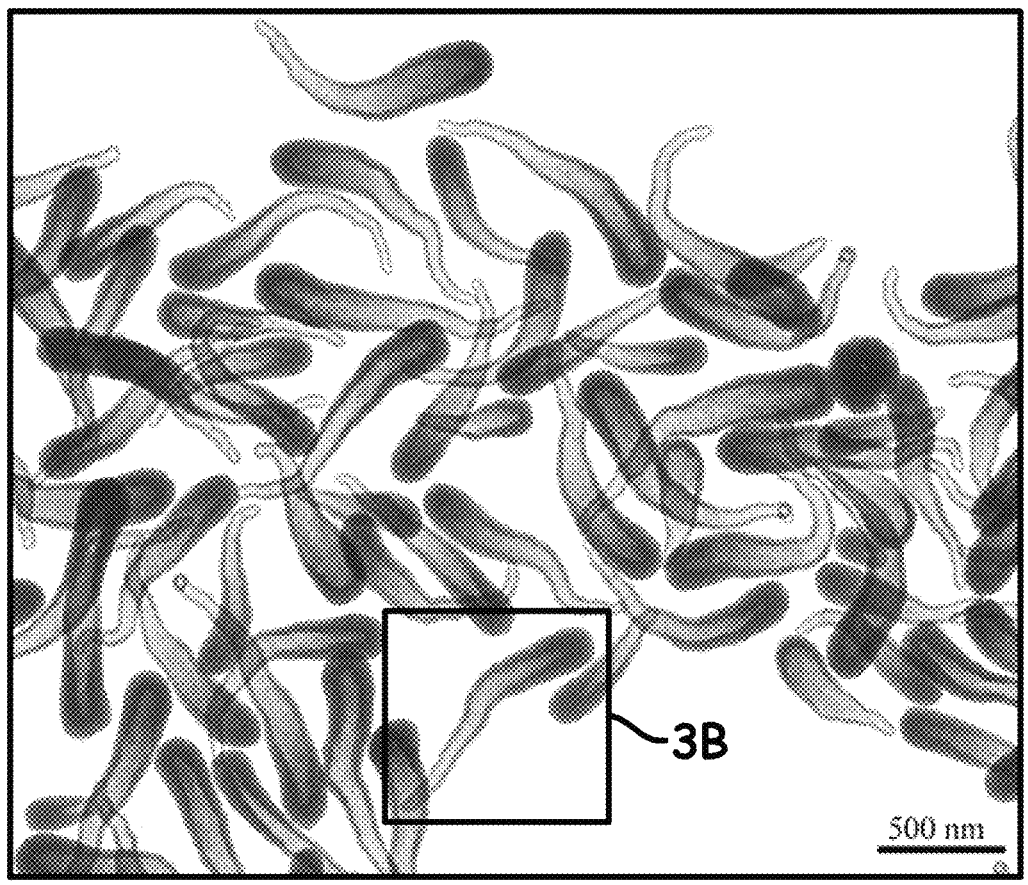
FIGS. 3A and 3B show tadpole-shaped HSNs.
Figure 3B:
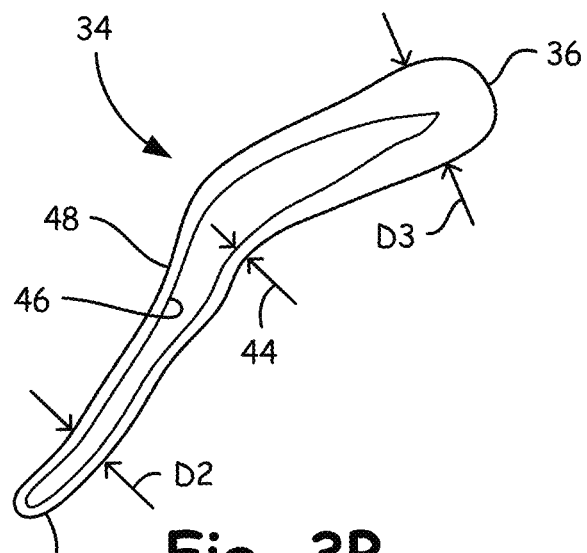

FIG. 3 is a TEM image showing tadpole-shaped HSN 34, which includes first end 36 and generally opposite second end 38. An enlarged representation of tadpole-shaped HSN 34 is shown in FIG. 3B. A portion of tadpole-shaped HSN 34 near first end 36 has diameter D1 and a portion near second end 38 has diameter D2. Tadpole-shaped HSN 34 is hollow and includes silica shell 44 having inner surface 46 and opposite outer surface 48. Diameter D1 is generally larger than diameter D2. Thus, first end 36 resembles a tadpole head and second end 38 resembles a tadpole tail. Silica shell 44 is generally thicker near first end 36 than it is near second end 38.

Figure 4A:
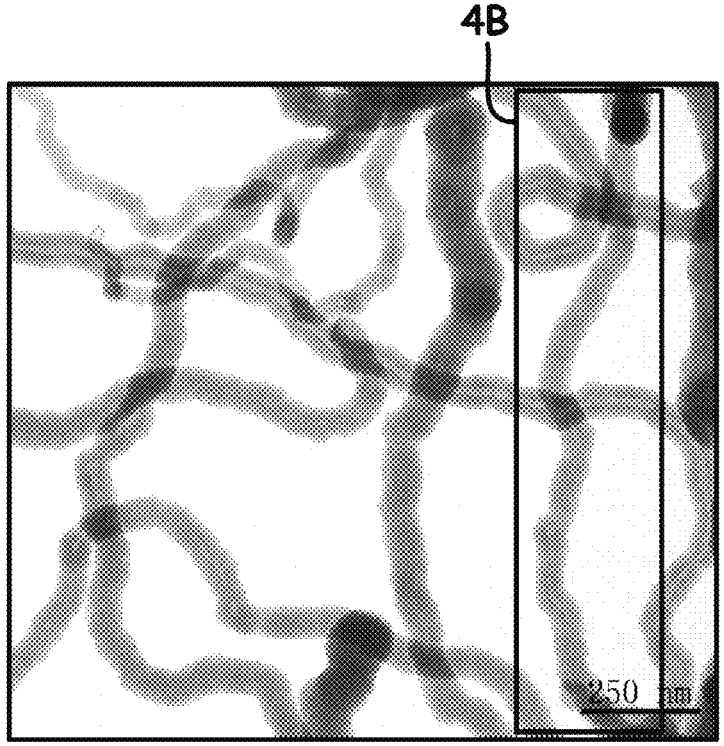
FIGS. 4A and 4B show nanowire HSNs.
Figure 4B:
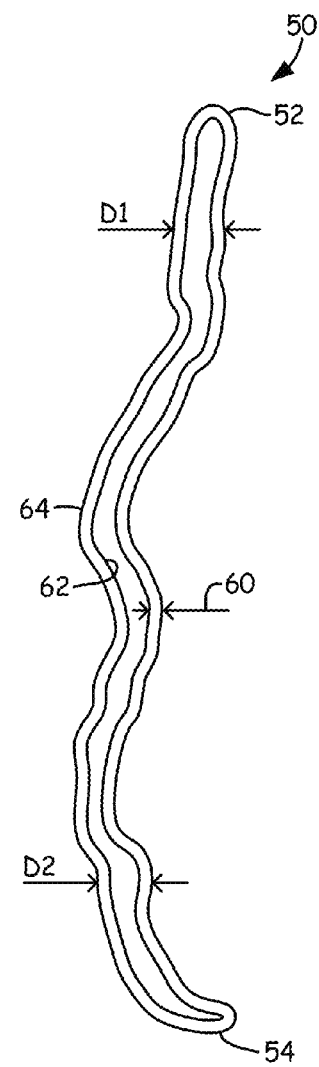

FIG. 4 is a TEM image showing developing HSN nanowire 50. Complete HSN nanowire 50 will have a similar shape but possess an increased length. An enlarged representation of HSN nanowire 50 is shown in FIG. 4B. HSN nanowire 50 has a generally cylindrical shape. HSN nanowire 50 includes first end 52 and second end 54. First end 52 has diameter D1 and second end 54 has a diameter D2. HSN nanowire 50 is hollow and includes silica shell 60 having inner surface 62 and opposite outer surface 64. Diameter D1 is generally equivalent to the diameter D2.

Monodispersed HSNs of different morphologies (e.g., spherical, tadpole-shaped and nanowire) can be prepared by forming a mixture of (PVP) and an alcohol. Water and sodium citrate are then added to the mixture. This is followed by the addition of a silicon-containing compound along with a catalyst. Tetraethyl orthosilicate (TEOS) is one example of a silicon-containing compound. The reaction can proceed at room temperature and the resulting HSNs can be collected using appropriate collection techniques.

A solid silica nanomaterial can be formed by the hydrolysis and condensation of a silicon-containing molecule such as TEOS in an ethanol (EtOH) solution through a typical Ströber process. To obtain an HSN however, a suitable surfactant is required to form a surfactant-water droplet prior to the hydrolysis of the silicon containing compound.

PVP is one example of a suitable surfactant for the formation of HSNs and acts as a soft template for HSN synthesis. PVP is an amphiphilic, non-ionic polymer, and is soluble in water and other polar solvents. When dry, PVP is a light, flaky hygroscopic powder, readily absorbing up to 40% of its weight in atmospheric water. In solution, PVP has excellent wetting properties and readily forms films. The presence of a highly polar amide group with a pyrrolidone ring causes PVP to be soluble in water and many non-aqueous solvents. Additionally, at a high concentration of PVP (>57 wt %) in an aqueous solution, water molecules tend to be bound to PVP instead of acting as a solvent. In this state the water is referred to as "bound water." Bound water can develop into PVP-water droplets in a solution containing an alcohol. The PVP-water droplets act as a soft template for the formation of HSNs.

The effectiveness of PVP as a soft template in HSN synthesis can be demonstrated by way of example. When TEOS is used as the silicon-containing compound and EtOH is used as the solvent, the hydrolysis and condensation of TEOS occurs at the interface of an organic phase (e.g., the alcohol) and a PVP-water droplet. As the hydrolysis and condensation proceed, the resulting silica assembles around the PVP-water droplets. This silica acts as a silica nucleus for the growth of a silica shell. An HSN is obtained after removing the PVP-water droplet by calcination. Thus, PVP serves as a soft template for HSN synthesis.

PVP is important for the formation of HSNs. The absence of PVP will result in the formation of solid silica nanomaterials. The addition of PVP into the solution will however, result in the formation of HSNs. For instance, when the concentration of PVP in an aqueous solution is about 31.3 wt %, and all other reaction steps are performed as described herein, a mixture of HSNs and solid silica nanomaterials is formed. For the purposes of this patent application, PVP wt % is calculated by dividing the weight of PVP in the mixture by the weight of water in the mixture. Because the concentration of about 31.3 wt % PVP is lower than the "bound water" concentration of 57 wt %, a limited number of water molecules bind to PVP, thus a limited amount of PVP-water droplets are formed. This results in some of the silica nanomaterials formed being solid. When the concentration of PVP is generally greater than or equal to 57 wt %, for instance from about 62.5 wt % to about 125 wt %, HSNs are uniformly produced.

Sodium citrate is used as a stabilizer for the PVP-water droplets. Without a stabilizer for the PVP-water droplets, only solid silica nanomaterials will form. The overall concentration of sodium citrate tested in the reaction mixtures ranged from about 0.10 M to about 0.30 M. The amount of sodium citrate added to the solution within the range of 0.10 M and 0.30 M appears to have no effect on the morphology of the HSNs. For instance, when the tadpole-shaped HSNs were formed, sodium citrate concentrations ranging from 0.10 M to 0.30 M did not significantly affect the tadpole shape. But without the addition of sodium citrate no HSNs were formed. Generally, it was found that as the concentration of sodium citrate increases the length of non-spherical HSNs generally decreases.

The hydrolysis of the silicon-containing compound generally requires a catalyst. One example of a suitable catalyst for the reaction system described herein is ammonium hydroxide ($NH_4OH$). In theory, sodium hydroxide (NaOH) could also be used as a catalyst. The amount of the catalyst in the reaction system greatly affects the integrity and surface morphology of the synthesized silica nanomaterials. In a reaction system where TEOS is the silicon-containing compound and $NH_4OH$ is the catalyst, a low molar ratio of $NH_4OH$ to TEOS such as about 1.06 or about 2.12 results in products that are deformed and aggregated. Increasing the molar ratio to about 3.18 results in the formation of HSNs. At such a concentration some silica materials can have open ends. If the molar ratio is further increased to about 4.24 or about 5.30, perfectly intact, closed HSNs are formed. Increasing the molar ratio up to and beyond about 6.36 results in the majority of the reaction products becoming solid silica nanomaterials.

Different catalyst to silicon-containing compound molar ratios can also be used to control a HSN's shell thickness. A $NH_4OH$ to TEOS molar ratio of about 3.18 results in a HSN shell thickness of about 23.02±2.2 nm. A molar ratio of about 4.24 or about 5.30 increases the silica shell thickness to about 32.8±2.2 nm. And a molar ratio of about 6.36 results in a silica shell thickness of about 50.6±2.9 nm. Silica shell thickness can also be tuned by varying the quantity of silicon-containing compound added to the reaction system. In the case of tadpole-like HSNs, the $NH_4OH$ to TEOS molar ratio can also affect the length of the HSN body (i.e. from first end 36 to second end 38). For instance, an $NH_4OH$ to TEOS molar ratio of about 3 results in tadpole-shaped HSNs having a body length of about 200 nm and an $NH_4OH$ to TEOS molar ratio of about 15 produces tadpole-shaped HSNs having a body length of about 2000 nm.

HSNs of a distinct morphology can be obtained depending on the alcohol solvent used in the reaction system. If EtOH is used as the solvent the resulting HSNs will generally have a spherical morphology. If 1-propanol is used as the solvent the resulting HSNs will generally be tadpole-shaped HSNs. If 1-pentanol is used as the solvent the resulting HSNs will generally be HSN nanowires.

The tunable nature of the reaction is a result of the ability of the EtOH and water produced by the hydrolysis and condensation of TEOS to homogenously mix with the chosen solvent. The hydrolysis [1] and condensation [2] of TEOS proceeds as follows:

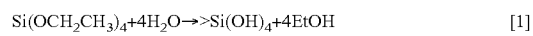

$$Si(OCH_2CH_3)_4 + 4H_2O \rightarrow Si(OH)_4 + 4EtOH \quad [1]$$

$$nSi(OH)_4 \rightarrow nSiO_2 + 2nH_2O \quad [2]$$

If EtOH is used as the solvent, the EtOH produced by the hydrolysis of TEOS and the water produced by the condensation of TEOS are able to homogenously mix with the solvent EtOH. As a result, the surface tension of the PVP-water droplets remains essentially constant. Thus, the formation of a perfectly spherical HSN occurs. If the produced EtOH and water cannot homogenously mix with the solvent however, the surface tension of the PVP-water droplets will change. This results in the shape of the PVP-water droplets changing. The changing shape of the droplets results in different morphologies of the HSN.

A tadpole-shaped HSN is obtained when 1-propanol is used as the solvent. The produced EtOH and water from the respective hydrolysis and condensation reactions will not homogenously mix with 1-propanol. Produced water tends to be bound to PVP rather than being dispersed in the 1-propanol solvent. The binding of water in this case changes the surface tension of the PVP-water droplet. As a result, the PVP-water droplets are deformed as the silica grows along the droplet. The resulting shape of the HSN after removal of the PVP-water droplet is a tadpole-shaped HSN.

As the water solubility of the solvent decreases the resulting HSN becomes more wire-like. For example, 1-pentanol has poor water solubility characteristics. As a result, produced water and hydrolyzed intermediates do not mix well with the 1-pentanol solvent but instead stay close to the PVP-water droplets. As condensation occurs, the droplet moves outwardly and the silica shell continues to grow along the same direction. The resulting morphology is a HSN nanowire. Thus, the described method enables the production of HSNs of different morphologies depending on the solvent used in the reaction system.

The reaction to form HSNs can be carried out at room temperature. HSN products can be collected after one hour or after longer periods of time (e.g., overnight). Collection can occur by centrifuging the reaction mixture, removing the supernatant, and washing the precipitates with EtOH. The PVP soft template is best removed through calcination.

In sum, HSNs can be produced and some of their properties tuned by adjusting one or more of a number of parameters. The concentration of PVP relative to water can vary from about 31 wt % to about 125 wt %. Most preferably, the PVP concentration is from about 57 wt % to about 70 wt %. An alcohol solvent such as ethanol, 1-propanol, or 1-pentanol can be mixed with the PVP. If TEOS is used as the silicon containing compound and $NH_4OH$ is used as a catalyst, the molar ratio of $NH_4OH$ to TEOS can vary from about 3 to about 6. A higher $NH_4OH$ to TEOS concentration leads to thicker HSNs, so the choice of concentration can depend on the desired thickness of the HSNs. Laboratory testing has shown that: (1) the reaction can occur at or near room temperature; (2) the reaction can occur anywhere from 1 hour to 16 hours, (3) the HSNs can be collected by centrifugation at about 3000 RPM for about 20 min; and (4) the PVP can be removed through a calcination process at 500-600° C. for about 4 hours. The shell thickness of the resulting HSNs can vary from about 20 nm up to about 64 nm. The HSNs can have a diameter ranging from 64 nm to about 365 nm. If the HSN has two ends, the shell thickness or diameter of a portion of one end may be different than the shell thickness or diameter of a portion of the other end. HSNs can have a body length of about 60 nm to about 2000 nm.

To better understand how HSNs of a tunable morphology are prepared and obtained and to appreciate the structure of the HSNs, examples are provided.

Example 1

Spherical HSNs

A total of 0.50 g of PVP was added to 10.00 mL of pure ethanol and the mixture was sonicated until all PVP dissolved. A 0.40 mL aliquot of water and 0.10 mL of 0.17 M sodium citrate were then added to the PVP/ethanol mixture. This was followed by the addition of 0.40 mL of $NH_4OH$ and 0.15 mL of TEOS. All reagents were added to a reaction flask and shaken gently. The reaction was allowed to proceed overnight at room temperature. HSNs were collected by centrifuging the reaction product at 3,000 rpm for 30 minutes. The supernatant was removed and the precipitates were washed 3 times with ethanol for 20 minutes. To remove the PVP and obtain HSNs, a calcination process was used at 500-600° C. for 4 hours.

A transmission electron microscope (TEM) and a field emission scanning electron microscope (SEM) were used to take images of the developed silica nanomaterials. The TEM images are shown in FIG. 2. Both TEM and SEM images showed that when the above described reaction was performed monodispersed spherical HSNs with a relative uniform size and a smooth surface were obtained. The diameter of the HSNs was 365±49 nm. The thickness of the HSNs could vary depending on the concentration of $NH_4OH$ used, ranging from 23.02±3.1 nm at a $NH_4OH$ to TEOS molar ratio of 4.24 to 50.6±2.9 nm at a $NH_4OH$ to TEOS molar ratio of 6.36.

Example 2

Tadpole-shaped HSNs

A total of 3.00 g of PVP was added to 3.00 mL of 1-propanol and the mixture was sonicated for 30 minutes until all PVP dissolved. A 3.00 mL aliquot of 95% ethanol, 0.84 mL water, and 0.20 mL of 0.17 M sodium citrate was added to the PVP/1-propanol mixture. This was followed by the addition of 0.60 mL of $NH_4OH$ and 0.30 mL of TEOS. All reagents were added to a reaction flask and shaken gently. The reaction proceeded overnight at room temperature. The resulting tadpole-shaped HSNs were collected by centrifuging at 3,000 rpm for 30 minutes. The supernatant was then removed and the precipitates were washed 3 times with ethanol for 20 minutes at a centrifuging speed of 3,000 rpm. To remove the PVP and obtain HSNs, a calcination process was used at 500-600° C. for 4 hours.

To image the developed silica nanomaterials both TEM and SEM were used. The TEM images are shown in FIG. 3. The TEM and SEM images show that when the above described reaction was performed, monodispersed tadpole-shaped HSNs with a relative uniform size and a smooth surface were obtained. The produced tadpole-shaped HSNs possessed a relatively round shape at one end that resembled the head of a tadpole. Materials obtained following this embodiment of the method described herein, had a mean cross-sectional diameter at the head portion of 235±35 nm and a silica shell thickness at the head portion of 58±9 nm. The HSN gradually became thinner towards the tail end and resembled the tail of a tadpole. HSNs obtained following this embodiment of the method described herein had a mean cross-sectional diameter at the tail portion of 64±5 nm and a shell thickness at the tail portion of 23±5 nm.

Example 3

HSN Nanowires

A total of 3.00 g of PVP was added to 3.00 mL of 1-pentanol and the mixture was sonicated for 30 minutes until all PVP dissolved. A 3.00 mL aliquot of 95% ethanol, 0.84 mL water, and 0.20 mL of 0.17 M sodium citrate was added to the PVP/1-pentanol mixture. This was followed by the addition of 0.10 mL of $NH_4OH$ and 0.30 mL of TEOS. All reagents were added to a reaction flask and shaken gently. The reaction was allowed to proceed overnight at room temperature. The resulting HSN nanowires were collected by centrifuging at 3,000 rpm for 30 minutes. The supernatant was removed and the precipitates were washed 3 times with ethanol for 20 minutes at a centrifuging speed of 3,000 rpm. To remove the PVP and obtain HSNs a calcination process was used at 500-600° C. for 4 hours.

To image the developed silica nanomaterials both TEM and SEM were used. The TEM images are shown in FIG. 4. TEM and SEM images showed that when the above described reaction was performed monodispersed HSN nanowires were obtained. The HSN nanowires had a generally equal diameter at each end of the HSN that ranged from 60 to 100 nm. The length of the nanowires increased as the reaction time increased. When the reaction was allowed to proceed for around one hour the HSN nanowires had a length of about 150 nm. When the reaction was allowed to proceed for around five hours the HSN nanowires had a length of about 850 nm. If the reaction was allowed to proceed even longer and a sufficient amount of reagents were used, the length of the HSN nanowires could increase up to tens of micrometers.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A hollow nanomaterial comprising:
a plurality of $SiO_2$ molecules joined together to form a shell extending from a first end to a second end generally opposite the first end and having a generally circular cross section, an inner surface and an opposite outer surface, wherein a cross-sectional diameter of a portion near the first end is about 235 nm and a cross-sectional diameter of a portion near the second end is about 64 nm.

2. The hollow nanomaterial of claim 1, wherein the shell has a thickness at the first end greater than a thickness at the second end.

3. The hollow nanomaterial of claim 1, wherein the shell has a thickness at the first end substantially equal to a thickness at the second end.

4. The hollow nanomaterial of claim 1, wherein the shell has an average thickness from about 20 nm to about 55 nm.

5. A hollow nanomaterial comprising:
a plurality of $SiO_2$ molecules joined together to form a shell extending from a first end to a second end generally opposite the first end and having a generally circular cross section, an inner surface and an opposite outer surface, wherein the thickness of the portion near the first end is about 58 nm and the thickness of the portion near the second end is about 23 nm.

6. The hollow nanomaterial of claim 5, wherein a portion of the hollow nanomaterial near the first end has a diameter greater than a diameter of a portion near the second end.

7. The hollow nanomaterial of claim 5, wherein a portion of the hollow nanomaterial near the first end and a portion near the second end have diameters that are substantially equal.

8. The hollow nanomaterial of claim 5, wherein a cross-sectional diameter of a portion near the first end is about 235 nm and a cross-sectional diameter of a portion near the second end is about 64 nm.

9. The hollow nanomaterial of claim 6, wherein a length between the first and second ends is between about 200 nm and about 2000 nm.

10. The hollow nanomaterials of claim 7, having a length between the first and second ends between about 100 nm and about 20 μm.

11. The hollow nanomaterials of claim 7, having a length between the first and second ends between about 100 nm and about 900 nm.

12. A method for forming a hollow silica nanomaterial having a plurality of $SiO_2$ molecules joined together to form a shell, the method comprising:
combining PVP and an alcohol to form a mixture;
adding water to the mixture;
adding sodium citrate to the mixture;
adding a silicon-containing compound to the mixture;
adding a catalyst to the mixture;
collecting the hollow silica nanomaterial, wherein the nanomaterial extends from a first end to a second end generally opposite the first end and comprises a generally circular cross section, an inner surface and an opposite outer surface, wherein a cross-sectional diameter of a portion near the first end is about 235 nm and a cross-sectional diameter of a portion near the second end is about 64 nm.

13. The method of claim 12, further comprising removing PVP.

14. The method of claim 12, wherein the alcohol is selected from the group consisting of ethanol, 1-propanol, and 1-pentanol.

15. The method of claim 12, wherein the catalyst is $NH_4OH$.

16. The method of claim 12, wherein the silicon-containing compound is TEOS.

17. The method of claim 12, wherein the concentration of PVP relative to the water varies from about 31 wt % to about 125 wt %.

18. The method of claim 17, wherein the concentration of PVP relative to the water varies from about 57 wt % to about 70 wt %.

19. The method of claim 12, wherein the silicon-containing compound is TEOS and the $NH_4OH$:TEOS molar ratio is from about 3 to about 6.

20. The method of claim 12, wherein the hollow nanomaterials are collected at least 1 hour after the water, sodium citrate, silicon-containing compound and catalyst are added to the mixture.

21. The method of claim 12, wherein all method steps are performed at room temperature.

22. The method of claim 12, wherein the hollow silica nanomaterials are collected by centrifugation.

23. The method of claim 12, wherein PVP is removed from the hollow silica nanomaterials by calcination.

* * * * *